US012601469B2

(12) United States Patent
Zhang

(10) Patent No.: US 12,601,469 B2
(45) Date of Patent: Apr. 14, 2026

(54) TRACK LIGHT

(71) Applicants: SUZHOU OPPLE LIGHTING CO., LTD., Suzhou City (CN); OPPLE LIGHTING CO., LTD., Shanghai (CN)

(72) Inventor: Wang Zhang, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 19/193,924

(22) Filed: Apr. 29, 2025

(65) Prior Publication Data

US 2025/0257867 A1 Aug. 14, 2025

Related U.S. Application Data

(63) Continuation of application No. PCT/CN2023/129035, filed on Nov. 1, 2023.

(30) Foreign Application Priority Data

Nov. 1, 2022 (CN) ........................ 202222890589.X

(51) Int. Cl.

*F21V 21/34* (2006.01)
*F21S 8/00* (2006.01)
(Continued)

(52) U.S. Cl.

CPC .............. *F21V 21/34* (2013.01); *F21S 8/038* (2013.01); *H01R 13/6272* (2013.01); *H01R 25/142* (2013.01)

(58) Field of Classification Search

CPC .. F21S 4/28; F21S 8/038; F21V 21/34; H01R 13/6272

See application file for complete search history.

(56) References Cited

U.S. PATENT DOCUMENTS 5,128,847 A * 7/1992 Lin ...................... H01R 25/142 362/147
6,004,005 A * 12/1999 Demshki, Jr. ............. F21V 3/00 362/322
(Continued)

FOREIGN PATENT DOCUMENTS

CN 101893175 A 11/2010
CN 104048212 A 9/2014
(Continued)

OTHER PUBLICATIONS

International Search Report issued in PCT Application No. PCT/CN2023/129035 dated Feb. 16, 2024, (5p).

*Primary Examiner* — Alexander K Garlen
(74) *Attorney, Agent, or Firm* — Arch & Lake LLP; Shen Wang; Hao Tan

(57) ABSTRACT

A track light, including a track, a lamp and latch structures connecting the track and the lamp. Each latch structure comprises a latch member, a connection member, a gasket and a locking member. The lamp is provided with mounting portions and mounting holes penetrating through the mounting portions. The connection members penetrate through the mounting holes and extend out of the lower surfaces of the mounting portions. The locking members are inserted from bottom to top into the connection members and are locked to be fixed to the tail ends of the connection members. The gaskets are sleeved on the outer side of the tail ends of connection members and are pressed to be fixed between the lower surfaces of the mounting portions and the locking members. The connection members are configured to penetrate through the mounting holes and then extend out of the lower surfaces of the mounting portions.

10 Claims, 6 Drawing Sheets

(51) Int. Cl.
*H01R 13/627* (2006.01)
*H01R 25/14* (2006.01)

(56) References Cited

U.S. PATENT DOCUMENTS

| | | | | |
|---|---|---|---|---|
| 7,275,843 | B2 * | 10/2007 | Mier-Langner | F21V 21/28 362/648 |
| 7,563,016 | B1 * | 7/2009 | Mier-Langner | F21V 17/107 362/648 |
| 2006/0039168 | A1 * | 2/2006 | Mier-Langner | F21V 21/34 362/648 |
| 2011/0141749 | A1 * | 6/2011 | Fishman | H01R 29/00 362/373 |
| 2014/0085889 | A1 * | 3/2014 | Mackiewicz | F21V 21/35 29/426.6 |

FOREIGN PATENT DOCUMENTS

| | | | | |
|---|---|---|---|---|
| CN | 104361838 | A | 2/2015 | |
| CN | 105757092 | A | 7/2016 | |
| CN | 111828885 | A | 10/2020 | |
| CN | 212056813 | U | 12/2020 | |
| CN | 213577342 | U | 6/2021 | |
| CN | 115143430 | A | 10/2022 | |
| CN | 218599527 | U | 3/2023 | |
| DE | 202012100629 | U1 * | 5/2013 | F21V 21/025 |
| KR | 200472465 | Y1 * | 4/2014 | F21S 8/066 |

* cited by examiner

TRACK LIGHT

CROSS-REFERENCE TO RELATED APPLICATION

The present application is based upon and claims the priority of PCT patent application No. PCT/CN2023/129035 filed on Nov. 1, 2023 claims the priority of the Chinese patent application with application Ser. No. 202222890589.X filed on Nov. 1, 2022, the entire contents of which are hereby incorporated by reference herein for all purposes.

TECHNICAL FIELD

The present disclosure relates to a track light, and belongs to a technical field of track lights.

BACKGROUND

Sometimes, a locking structure is provided on a lamp of a track light to connect with a track. Specifically, the lamp is placed in the track and then a locking structure is turned so that the locking structure is clamped with the track to achieve a detachable connection between the lamp and the track.

SUMMARY

The present disclosure provides a track light.

Accordingly, the track light provided in this disclosure may include a track, a lamp and a locking structure connecting the track and the lamp, where the locking structure may include a locking member for insertion into the track, a connection member rotatably connected to the lamp, a spacer and a locking fastener.

The lamp may be provided with a mounting portion and a mounting hole passing through the mounting portion, the connection member passes through the mounting hole and may extend beyond a lower surface of the mounting portion.

The locking fastener may be inserted into the connection member from lower to upper and may be locked and fixed with a terminal end of the connection member, the spacer may be sleeved outside the terminal end of the connection member and may be pressed and fixed between the lower surface of the mounting portion and the locking fastener.

It is to be understood that both the foregoing general description and the following detailed description are exemplary and explanatory only and are not restrictive of the present disclosure.

DETAILED DESCRIPTION

Figure 1:
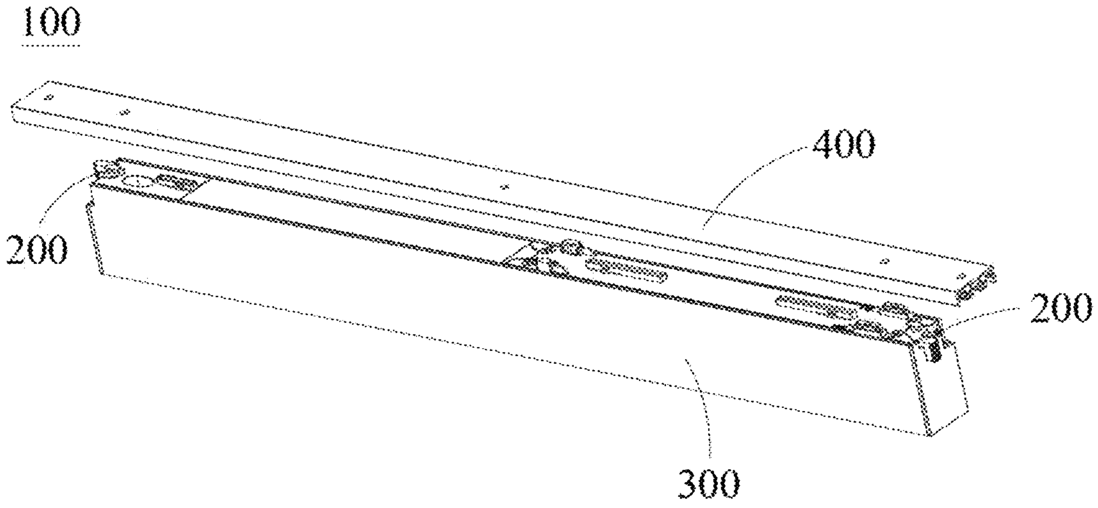
FIG. 1 is a schematic perspective view of a track light according to an example of the present disclosure.
Figure 2:
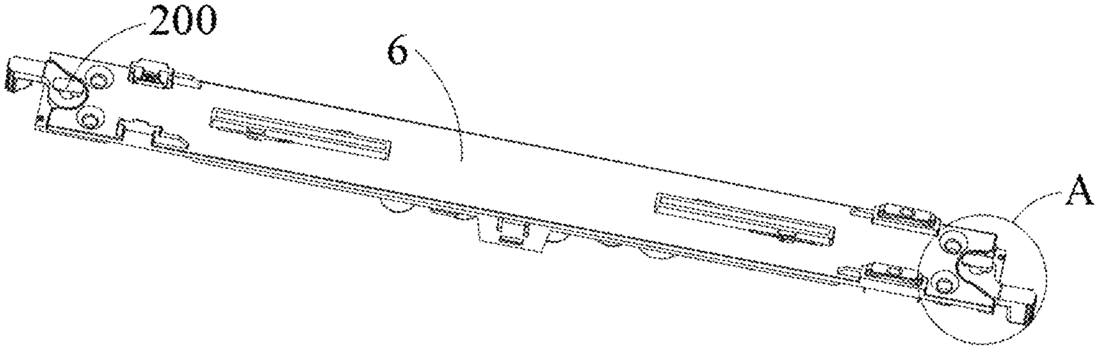
FIG. 2 is a schematic perspective view of a bottom structure of the lamp in FIG. 1.
Figure 3:
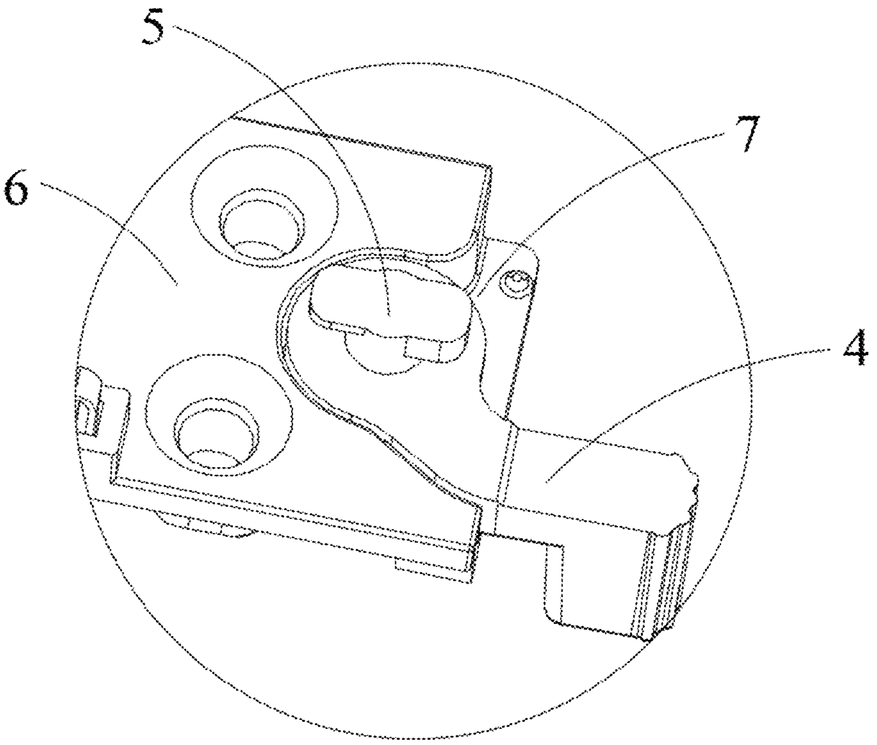
FIG. 3 is an enlarged view of part A in FIG. 2.
Figure 4:
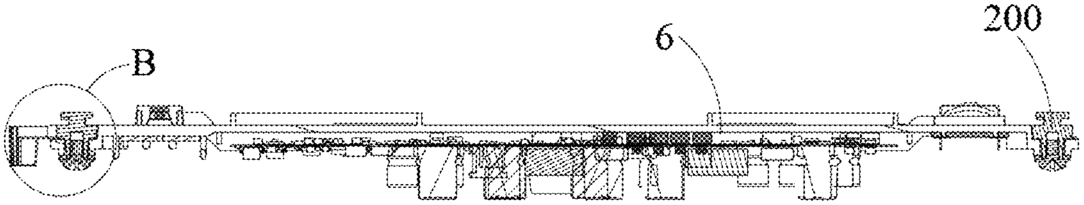
FIG. 4 is a cross-sectional view of the lamp of FIG. 2.
Figure 5:
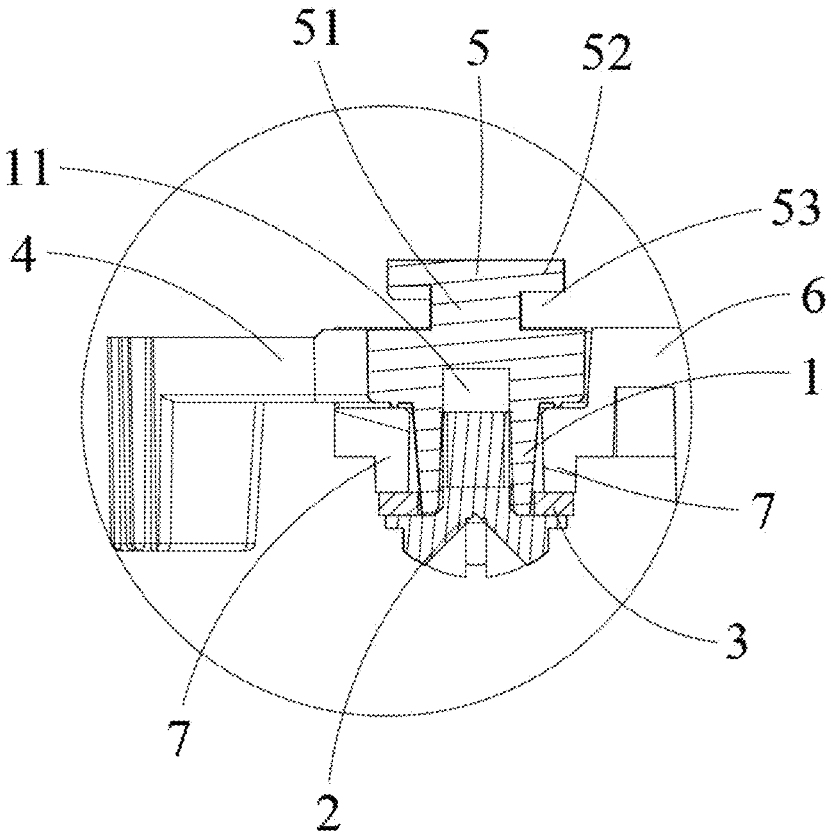
FIG. 5 is an enlarged view of part B in FIG. 4.

In order to make the objectives, technical solutions and advantages of the present disclosure clearer, the present disclosure is described in detail below with reference to the accompanying drawings and examples.

Description of reference numerals that may be used in this disclosure may include:

track light 100, locking structure 200, lamp 300, track 400, connection member 1, locking hole 11, connection surface 12, locking fastener 2, locking shaft 21, locking head 22, spacer 3, handle 4, rotating portion 41, grip portion 42, locking member 5, rotating shaft portion 51, abutment portion 52, receiving groove 53, base plate 6, mounting portion 7, mounting hole 71, rotation space 72, sliding groove 8, through groove 9, blocking tab 10.

Sometimes, it is assembling a locking structure with the lamp, through forming a hole in the lamp, making one end of the locking structure extend into the hole, and disposing a screw connected with the locking structure at the other end of the locking structure, and through turning the screw, so as to lock the locking structure to the lamp. However, this locking method needs to control the locking degree of the screw during the actual production process. If the locking degree is large, the locking structure will be difficult to rotate relative to the lamp. If the locking degree is small, it will be prone to separate the locking structure from the screw during use, resulting in an unstable connection phenomenon, and the degree of locking is difficult to control, which is not conducive to mass production.

In view of this, it is necessary to propose a new locking structure to solve the above problems.

Referring to FIG. 1, the present disclosure discloses a track light 100 for illumination. The track light 100 includes a lamp 300, a track 400, and a locking structure 200 provided on the lamp 300, wherein the lamp 300 is detachably connected to the track 400 through the locking structure 200, so that the track 400 can supply power to the lamp 300. Specifically, the locking structure 200 includes a locking member 5 for insertion into the track 400, a connection member 1 rotatably connected to the lamp 300, a spacer 3 and a locking fastener 2. The locking structure 200 can rotate relative to the lamp 300. In a case where the locking member 5 of the locking structure 200 extends into the track 400, the locking structure 200 is turned so that the locking structure 200 is engaged with the track 400. At this time, stable power supply from the track 400 to the lamp 300 can be achieved.

In this example, two locking structures 200 are provided, which are respectively located at two ends of the lamp 300, so as to improve the connection stability between the lamp 300 and the track 400. Of course, in other examples, the locking structure 200 may be set to other numbers according to actual conditions, and is not limited here.

In this application, the track 400 and the mounting structure of the mounting surface, the power supply structure between the track 400 and the lamp 300, and the light-emitting component (not shown) of the lamp 300 may all be designed according to the prior art, and the main improvement point of this application is the locking structure 200 and the connection method between the locking structure 200 and the lamp 300, and the following specification will specifically describe the locking structure 200.

Referring to FIGS. 2 to 9, the locking structure 200 includes a connection member 1, a spacer 3 and a locking fastener 2, and the lamp 300 is provided with a mounting portion 7 and a mounting hole 71 passing through the mounting portion 7, and the connection member 1 passes through the mounting hole 71 and extends beyond a lower surface of the mounting portion 7, the locking fastener 2 is inserted into the connection member 1 from lower to upper and is locked and fixed with a terminal end of the connection member 1, and the spacer 3 is sleeved outside the terminal end of the connection member 1 and is pressed and fixed between the lower surface of the mounting portion 7 and the locking fastener 2. That is to say, in a direction of an axis of the connection member 1, a depth of the mounting hole 71 is less than a height of the connection member 1.

Among them, the lamp 300 includes a base plate 6 disposed between the track 400 and the light-emitting component, and mounting portions 7 are disposed at both ends of the base plate 6. Mounting holes 71 extend through the mounting portion 7 in a mounting direction of the lamp 300 and the track 400, and the connection member 1 passes through the mounting hole 71 from a side of the base plate 6 close to the track 400 toward a side close to the light-emitting component, the locking fastener 2 is provided on the side of the base plate 6 close to the light-emitting component and is locked and connected with the connection member 1, and the locking fastener 2 is unable to pass completely through the mounting hole 71. In a case where the locking fastener 2 is locked, the locking fastener 2 presses the spacer 3 to form a friction force between the locking fastener 2 and the base plate 6 to prevent the locking structure 200 from rotating relative to the mounting portion 7 in a free state.

Specifically, a difference between the height of the connection member 1 and the depth of the mounting hole 71 is 0.9 mm±0.2 mm, that is, in a case where the connection member 1 is received in the mounting hole 71, the length of the connection member 1 extending outward from the inside of the mounting hole 71 is 0.9 mm±0.2 mm.

Stated alternatively, an end of the mounting portion 7 close to the light-emitting component is the lower surface, and an end of the connection member 1 close to the light-emitting component is a connection surface 12. In a case where the connection member 1 is received in the mounting hole 71 and locked with the locking fastener 2, a difference in height between the lower surface and the connection surface 12 is 0.9 mm±0.2 mm.

The locking fastener 2 includes a locking shaft 21 and a locking head 22 fixedly connected to the locking shaft 21. The terminal end of the connection member 1 is provided with a concave locking hole 11. The locking shaft 21 is inserted into the locking hole 11 such that the locking head 22 abuts against the connection member 1. The spacer 3 is disposed between the locking head 22 and the mounting portion 7. Among them, the locking hole 11 is recessed from one end of the connection member 1 close to the light-emitting component toward the track 400, and the locking hole 11 is provided with internal threads, and the outer wall of the locking shaft 21 is provided with external threads. In a case where the locking shaft 21 is accommodated in the locking hole 11, the internal threads mesh with the external threads to achieve a threaded connection between the locking shaft 21 and the connection member 1. In a case where the locking fastener 2 is connected to the connection member 1, an external tool is used to drive the locking head 22 to rotate and simultaneously causing the locking shaft 21 to rotate, thereby reduce a distance between the locking head 22 and the connection member 1 until the locking shaft 21 is completely received in the mounting hole 71 and the locking head 22 abuts against the connection member 1. At this time, the spacer 3 is compressed to its minimum thickness.

When the locking structure 200 rotates, the locking structure 200 drives the locking fastener 2 to rotate synchronously, and a friction force is generated between the compressed spacer 3 and both the mounting portion 7 and the locking head 22 enabling the locking structure 200 to maintain a specific rotation angle without change, which improves the user's handling feel during use. At the same time, the locking fastener 2 is locked and connected to the connection member 1 and the locking head 22 abuts against the connection member 1. There is no need to control the locking degree between the locking fastener 2 and the connection member 1 during production, which improves production efficiency, and there is no need to apply thread glue between the locking shaft 21 and the locking hole 11, which saves the production cost of the lamp 300. Preferably, the locking fastener 2 is a screw.

The spacer 3 is an elastic spacer. In a free state, a thickness of the spacer 3 is greater than a distance between the locking head 22 and the mounting portion 7, so that in a case where the locking fastener 2 and the connection member 1 are locked and connected, the spacer 3 can be compressed to generate a friction force between the locking head 22 and the mounting portion 7. By setting the spacer 3 as an elastic spacer, on the one hand, the friction force between the locking structure 200 and the mounting portion 7 is increased, and on the other hand, the friction force between the locking structure 200 and the mounting portion 7 is smaller than the locking fastener 2 and the connection member 1, the locking fastener 2 will not dislodge from the connection member 1 during the rotation. Preferably, the material of the elastic spacer is an elastic material, specifically a softer rubber product, such as a silicone spacer.

Specifically referring to FIGS. 5 to 9, the locking structure 200 includes a handle 4 connected to the connection member 1, the mounting portion 7 includes a rotation space 72 in communication with the mounting hole 71, and the handle 4 is received in the rotation space 72 and rotatable with the connection member 1 as an axis in the rotation space 72.

Specifically, the handle 4 includes a grip portion 42 and a rotating portion 41, the rotating portion 41 is fixedly connected to the connection member 1, and the grip portion 42 extends outward from the rotating portion 41 to push the rotating portion 41 and the connection member 1 to rotate relative to the mounting portion 7. Among them, the rotation space 72 is recessed from one end of the mounting portion 7 away from the light-emitting component toward the light-emitting component, and the rotation space 72 is arranged in a triangular shape in a projection direction of the lamp 300, and the grip portion 42 may respectively abut against two sides of the triangle to realize the rotation of the locking structure 200, and the mounting hole 71 is provided at a vertex of the triangle.

The locking structure 200 has two usage statuses. In a case where the locking structure 200 is in a released state, the grip portion 42 abuts against one side of the rotation space 72, and the grip portion 42 is perpendicular to the mounting portion 7 and protrudes outwardly. In a case where the locking structure 200 is in a locked state, the grip portion 42 abuts against the other side of the rotation space 72, and the grip portion 42 attached to the edge of the mounting portion 7, thereby reducing the volume of the lamp 300. In this example, the grip portion 42 is arranged in an obtuse angle shape, the end of the grip portion 42 away from the rotating portion 41 is placed outside the mounting portion 7, and the side of the grip portion 42 away from the rotating portion 41 is provided with anti-slip texture, thereby improving the user experience. Of course, in other examples, the grip portion 42 can also be set to other shapes according to actual conditions, and is not limited here.

The rotating portion 41 is located between the locking member 5 and the connection member 1, and the connection member 1 extends from the rotating portion 41 toward the locking fastener 2 in a tapered manner. Specifically, the mounting hole 71 is arranged in a cylindrical shape, and the connection member 1 is arranged in a tapering cylindrical shape, so that the connection member 1 can be received in the mounting hole 71 and rotate in the mounting hole 71.

Figure 6:
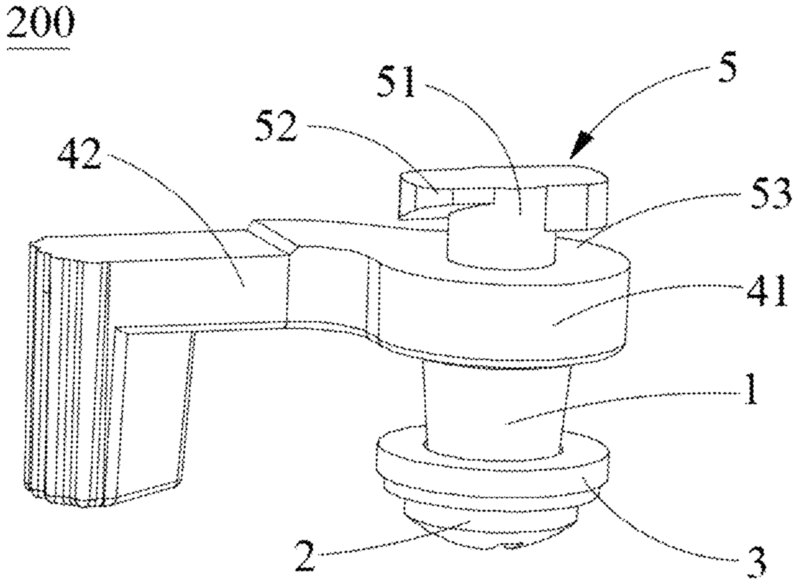
FIG. 6 is a schematic perspective view of the locking structure in FIG. 1.
Figure 7:
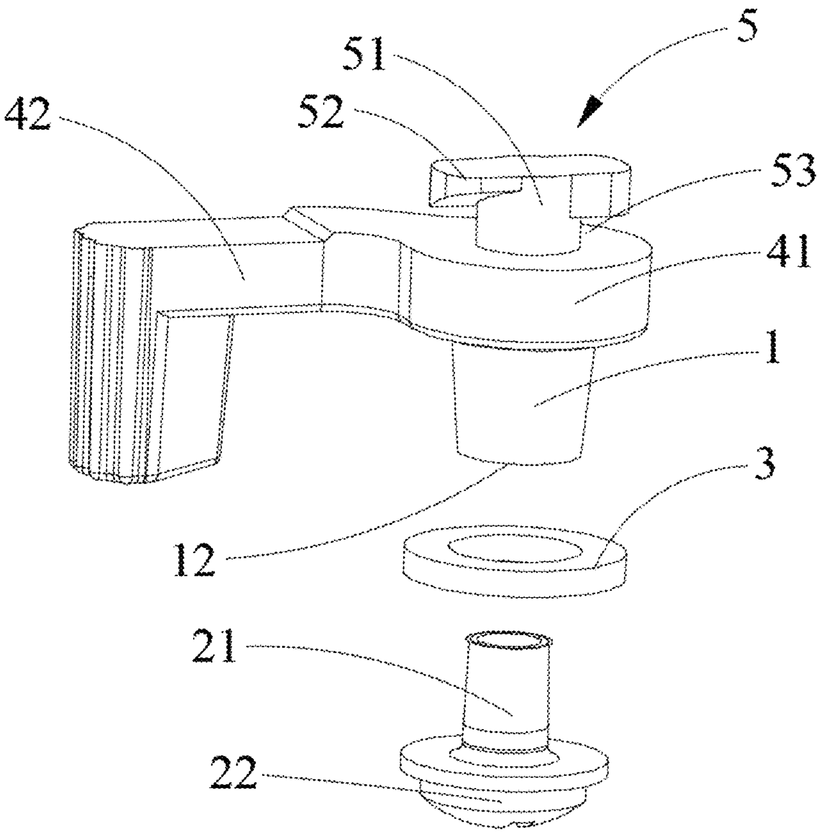
FIG. 7 is an exploded view of the locking structure in FIG. 6.
Figure 8:
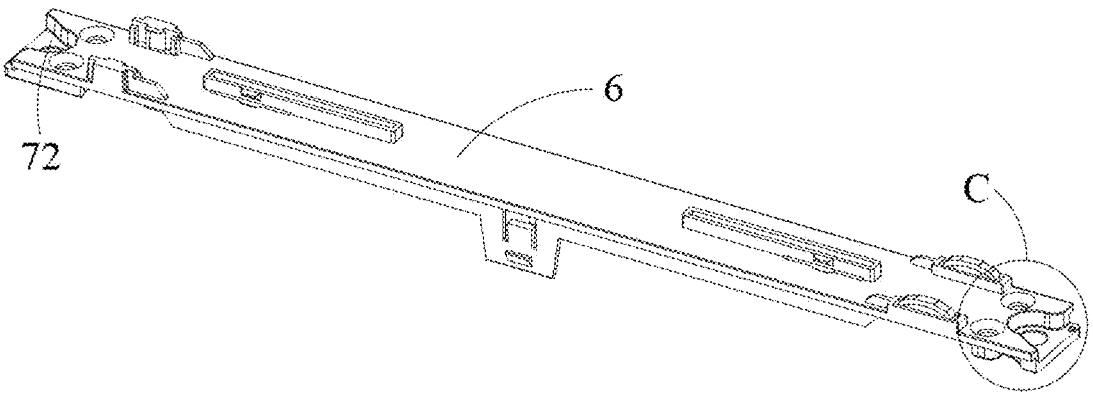
FIG. 8 is a schematic perspective view of the base plate in FIG. 2.
Figure 9:
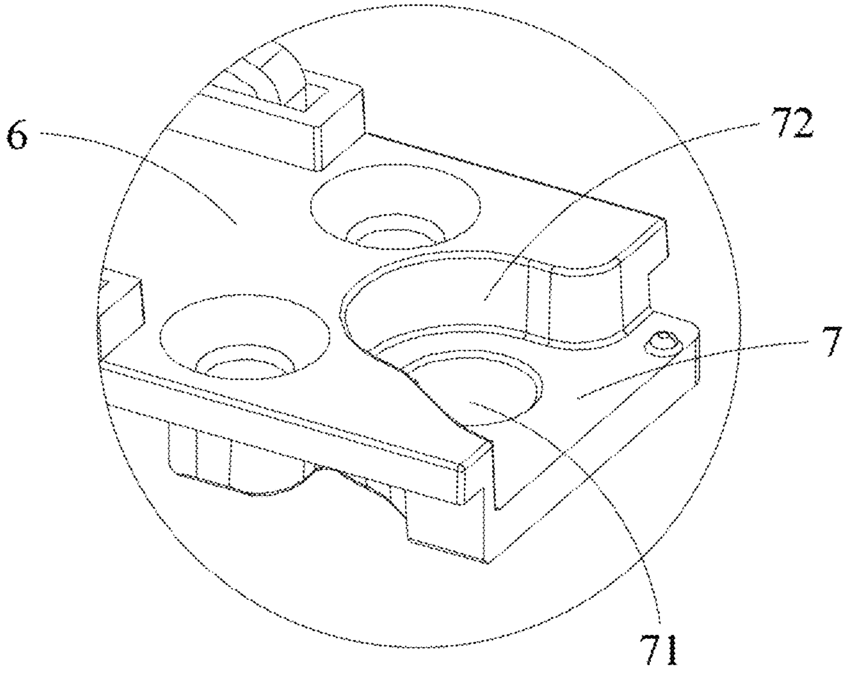
FIG. 9 is a partial enlarged view of part C in FIG. 8.
Figure 10:
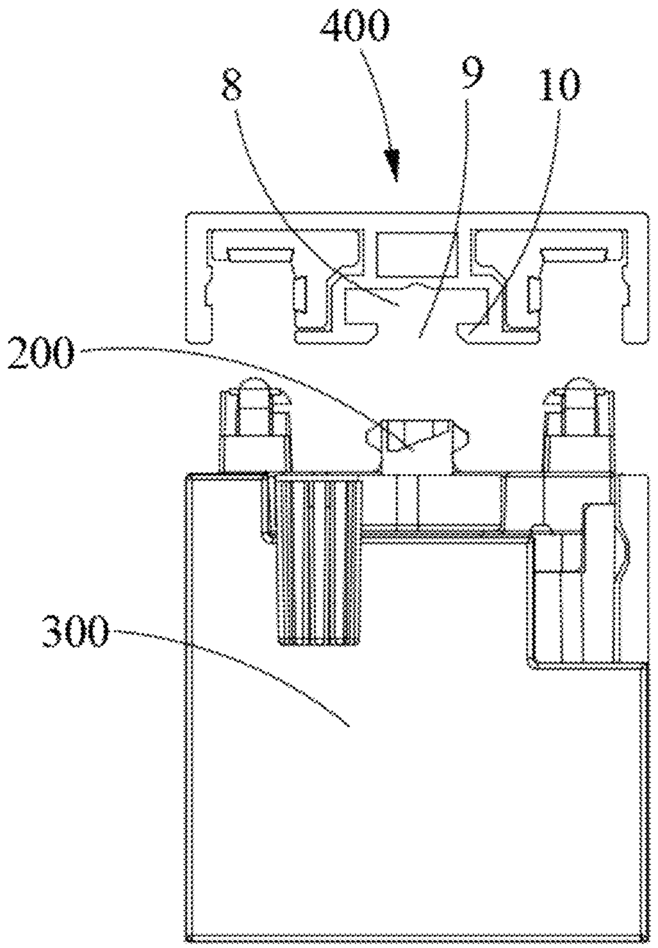
FIG. 10 is a cross-sectional view of the track light of FIG. 1.

Referring to FIGS. 6 and 7 in combination with FIG. 10, the track 400 includes a sliding groove 8 and a blocking tab 10, and the blocking tab 10 covers part of the sliding groove 8 to form a through groove 9 on the track 400 in communication with the sliding groove 8. The locking structure 200 includes a locking member 5, which passes through the through groove 9 and is received in the sliding groove 8, so that part of the locking member 5 abuts against the blocking tab 10 to realize the connection between the locking structure 200 and the track 400.

Specifically, the locking member 5 includes a rotating shaft portion 51 and an abutment portion 52 provided on the rotating shaft portion 51, the rotating shaft portion 51 and the abutment portion 52 pass through the through groove 9, and the abutment portion 52 is configured to rotate synchronously with the connection member 1, so as to be received in the sliding groove 8 and to abut against the blocking tab, or disengage from the sliding groove 8. Specifically, the handle 4 is rotated while driving the abutment portion 52 to rotate, so that the abutment portion 52 abuts against or separates from the blocking tab 10 to connect or detach the locking structure 200 from the track 400. The rotating shaft portion 51 and the connection member 1 are coaxially arranged, and the locking member 5 and the connection member 1 are separately arranged on both sides of the handle 4 to connect the lamp 300 and the track 400 respectively. The abutment portion 52 extends outward from the rotation shaft portion 51 to form a receiving groove 53 between the abutment portion 52 and the handle 4. In a case where the abutment portion 52 is received in the sliding groove 8, the blocking tab 10 is received in the receiving groove 53.

In this example, two blocking tabs 10 are provided and arranged opposite to each other, the through groove 9 is formed between two blocking tabs 10, and two abutment portions 52 are also provided and arranged opposite to each other. When the handle 4 is rotated to drive the abutment portion 52 rotates, the two abutment portions 52 respectively abuts against the two blocking tabs 10 to realize the installation of the locking structure 200 and the track 400. Of course, in other examples, only one blocking tab 10 may be provided. At this time, one corresponding abutment portion 52 is provided. In a case where the abutment portion 52 is received in the sliding groove 8, the handle 4 is rotated, so that the abutment portion 52 abuts against the blocking tab 10 to realize the installation of the locking structure 200 and the track 400, which is not limited here.

In this example, the sliding groove 8 is arranged in a shape of a long groove and is located in the middle position of the track 400 to facilitate the connection of the locking structure 200 and the track 400. Of course, in other examples, the sliding groove 8 may also be provided in other positions of the track 400, which is not limited here.

With the foregoing in mind, in the locking structure of the present disclosure, by setting the connection member 1 extend beyond the lower surface of the mounting portion 7 after passing through the mounting hole 71, that is, the depth of the mounting hole 71 is less than the height of the connection member 1, so that during the mounting process, the locking fastener 2 and the connection member 1 can be directly locked to prevent the connection member 1 from being dislodged from the mounting hole 71. It is also realized that the locking degree does not need to be controlled during the assembly process, thereby improving production efficiency. At the same time, by setting a spacer 3 between the locking fastener 2 and the mounting portion 7, the friction force between the locking structure 200 and the lamp 300 can be increased, and the stability of the connection between the locking structure 200 and the lamp 300 can be improved. Through the locking connection between the locking fastener 2 and the connection member 1, the use of thread glue during the assembly process is avoided, and the production cost of the track light 100 is saved.

The purpose of this disclosure is to provide a track light to solve the problem of difficulty in controlling the degree of locking when installing existing locking structures and lamps.

To achieve the above objective, the present disclosure provides a track light, including a track, a lamp and a locking structure connecting the track and the lamp, wherein the locking structure includes a locking member for insertion into the track, a connection member rotatably connected to the lamp, a spacer and a locking fastener, the lamp is provided with a mounting portion and a mounting hole passing through the mounting portion, the connection member passes through the mounting hole and extends beyond a lower surface of the mounting portion, the locking fastener is inserted into the connection member from lower to upper and is locked and fixed with a terminal end of the connection member, the spacer is sleeved outside the terminal end of the connection member and is pressed and fixed between the lower surface of the mounting portion and the locking fastener.

Optionally, the locking fastener includes a locking shaft and a locking head fixedly connected to the locking shaft, the terminal end of the connection member is provided with a concave locking hole, the locking shaft is inserted into the locking hole such that the locking head abuts against the connection member, the spacer is disposed between the locking head and the mounting portion.

Optionally, the spacer is an elastic spacer, in a free state, a thickness of the spacer is greater than a distance between the locking head and the mounting portion.

Optionally, in an insertion direction of the locking fastener, a difference between a height of the connection member and a depth of the mounting hole is 0.9 mm±0.2 mm.

Optionally, the locking structure further includes a handle connected to the connection member, and the mounting portion further includes a rotation space in communication with the mounting hole, the handle is received in the rotation space and rotatable with the connection member as an axis in the rotation space.

Optionally, the handle includes a grip portion and a rotating portion, the rotating portion is fixedly connected to the connection member, the grip portion extends outward from the rotating portion to push the rotating portion and the connection member to rotate relative to the mounting portion.

Optionally, the rotating portion is located between the locking member and the connection member, and the connection member extends from the rotating portion toward the locking fastener in a tapered manner.

Optionally, the locking member and the connection member are coaxially arranged and are separately arranged on both sides of the handle.

Optionally, the track includes a sliding groove and a blocking tab, the blocking tab covers part of the sliding groove to form a through groove on the track in communication with the sliding groove, the locking member passes through the through groove and is received in the sliding groove, the locking member abuts against the blocking tab.

Optionally, the locking member includes a rotating shaft portion and an abutment portion provided on the rotating shaft portion, the rotating shaft portion passes through the through groove, and the abutment portion is configured to rotate synchronously with the connection member, so as to be received in the sliding groove and to abut against the blocking tab, or disengage from the sliding groove.

Optionally, two blocking tabs are provided and arranged opposite to each other, the through groove is formed between two blocking tabs, and two abutment portions are also provided and arranged opposite to each other to abut against the two blocking tabs.

The beneficial effect of the present disclosure is: in the locking structure of the present disclosure, by setting the connection member extend beyond the lower surface of the mounting portion after passing through the mounting hole, that is, the depth of the mounting hole is less than the height of the connection member, so that during the mounting process, the locking fastener and the connection member can be directly locked to prevent the connection member from being dislodged from the mounting hole. At the same time, by setting a spacer between the locking fastener and the mounting portion, the friction force between the locking structure and the lamp can be increased, and the stability of the connection between the locking structure and the lamp can be improved.

The above examples are only used to illustrate the technical scheme of the application, but not to limit it. Although the application has been described in detail with reference to the examples, it should be understood by those skilled in the art that the technical scheme of the application can be modified or replaced by equivalents without departing from the spirit and scope of the technical scheme of the application.

The invention claimed is:

1. A track light, comprising: a track, a lamp and a locking structure connecting the track and the lamp, wherein: the locking structure comprises a locking member for insertion into the track, a connection member rotatably connected to the lamp, a handle connected to the connection member, a spacer, and a locking fastener, the lamp is provided with a mounting portion and a mounting hole passing through the mounting portion, the connection member passes through the mounting hole and extends beyond a lower surface of the mounting portion, the locking fastener is inserted into the connection member and is locked and fixed with a terminal end of the connection member, the handle comprises a grip portion and a rotating portion, the rotating portion is located between the locking member and the connection member, the connection member is fixedly connected to and extends from the rotating portion toward the locking fastener in a tapered manner, and the spacer is sleeved outside the terminal end of the connection member and is pressed and fixed between the lower surface of the mounting portion and the locking fastener.

2. The track light according to claim 1, wherein the locking fastener comprises a locking shaft and a locking head fixedly connected to the locking shaft, the terminal end of the connection member is provided with a concave locking hole, the locking shaft is inserted into the locking hole such that the locking head abuts against the connection member, and the spacer is disposed between the locking head and the mounting portion.

3. The track light according to claim 2, wherein the spacer is an elastic spacer, in a free state, a thickness of the spacer is greater than a distance between the locking head and the mounting portion.

4. The track lamp according to claim 1, wherein in an insertion direction of the locking fastener, a difference between a height of the connection member and a depth of the mounting hole is 0.9 mm±0.2 mm.

5. The track light according to claim 1, wherein the mounting portion further comprises a rotation space in communication with the mounting hole, and the handle is received in the rotation space and rotatable with the connection member as an axis in the rotation space.

6. The track light according to claim 5, wherein the grip portion extends outward from the rotating portion to push the rotating portion and the connection member to rotate relative to the mounting portion.

7. The track light according to claim 5, wherein the locking member and the connection member are coaxially arranged and are separately arranged on both sides of the handle.

8. The track light according to claim 1, wherein the track comprises a sliding groove and a blocking tab, the blocking tab covers part of the sliding groove to form a through groove on the track in communication with the sliding groove, the locking member passes through the through groove and is received in the sliding groove, and the locking member abuts against the blocking tab.

9. The track light according to claim 8, wherein the locking member comprises a rotating shaft portion and an abutment portion provided on the rotating shaft portion, the rotating shaft portion passes through the through groove, and the abutment portion is configured to rotate synchronously with the connection member, so as to be received in the sliding groove and to abut against the blocking tab, or disengage from the sliding groove.

10. The track light according to claim 9, wherein two blocking tabs are provided and arranged opposite to each other, the through groove is formed between two blocking tabs, and two abutment portions are also provided and arranged opposite to each other to abut against the two blocking tabs.

* * * * *